(12) United States Patent
Fukui

(10) Patent No.: US 10,603,999 B2
(45) Date of Patent: Mar. 31, 2020

(54) LOWER VEHICLE BODY STRUCTURE

(71) Applicant: TOYOTA JIDOSHA KABUSHIKI KAISHA, Aichi-ken (JP)

(72) Inventor: Ryosuke Fukui, Aichi-ken (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/290,800

(22) Filed: Mar. 1, 2019

(65) Prior Publication Data
US 2019/0275874 A1 Sep. 12, 2019

(30) Foreign Application Priority Data
Mar. 6, 2018 (JP) .................................. 2018-039656

(51) Int. Cl.
*B60K 1/04* (2019.01)
*B62D 25/20* (2006.01)

(52) U.S. Cl.
CPC ............. *B60K 1/04* (2013.01); *B62D 25/20* (2013.01); *B60K 2001/0438* (2013.01)

(58) Field of Classification Search
CPC .. B60K 1/04; B60K 2001/0438; B62D 25/20; B62D 21/03
See application file for complete search history.

(56) References Cited

U.S. PATENT DOCUMENTS

| | | | | |
|---|---|---|---|---|
| 7,086,492 B2* | 8/2006 | Kawasaki | ................ | B60K 1/04 180/274 |
| 8,079,435 B2* | 12/2011 | Takasaki | ................ | B60K 1/04 180/68.5 |
| 8,210,301 B2* | 7/2012 | Hashimoto | ............ | B60K 1/04 180/68.5 |
| 8,561,743 B2* | 10/2013 | Iwasa | ...................... | B60K 1/04 180/68.5 |
| 9,027,684 B2* | 5/2015 | Araki | ...................... | B60K 1/04 180/311 |
| 9,160,042 B2* | 10/2015 | Fujii | ....................... | B60K 1/04 |
| 9,490,459 B2* | 11/2016 | Takizawa | ............ | H01M 10/625 |
| 9,517,687 B2* | 12/2016 | Nakajima | ............ | B60K 1/04 |
| 9,673,433 B1* | 6/2017 | Pullalarevu | ........ | H01M 2/1083 |
| 9,809,101 B2* | 11/2017 | Ikeda | ................... | B62D 29/001 |
| 9,956,859 B2* | 5/2018 | Ikeda | ................... | B60K 1/04 |
| 9,994,260 B2* | 6/2018 | Ito | ........................... | B60G 3/06 |
| 10,099,546 B2* | 10/2018 | Hara | ...................... | B60L 50/66 |
| 10,207,574 B2* | 2/2019 | Ozawa | ................... | B60K 1/04 |
| 10,464,406 B2* | 11/2019 | Kawabe | ............ | B62D 25/2036 |

(Continued)

FOREIGN PATENT DOCUMENTS

JP 2014-226972 A 12/2014

*Primary Examiner* — Jacob B Meyer
(74) *Attorney, Agent, or Firm* — Hauptman Ham, LLP

(57) ABSTRACT

A lower vehicle body structure includes: a floor of the vehicle; a battery pack mounted underneath the floor; and a cross member that extends in a vehicle right-left direction across the battery pack over the battery pack, and is provided on the floor. The cross member includes inclined portions including a first inclined portion provided in a right half of the cross member in the vehicle right-left direction and a second inclined portion provided in a left half of the cross member in the vehicle right-left direction. The inclined portions become higher towards a center in the vehicle right-left direction.

19 Claims, 4 Drawing Sheets

(56) References Cited

U.S. PATENT DOCUMENTS

| | | | |
|---|---|---|---|
| 2004/0035632 A1* | 2/2004 | Kawasaki | B60K 1/04 180/274 |
| 2004/0235315 A1* | 11/2004 | Masui | B60K 1/04 439/34 |
| 2006/0113128 A1* | 6/2006 | Sato | B60K 1/04 180/65.1 |
| 2009/0166116 A1* | 7/2009 | Kiya | B60K 1/04 180/68.5 |
| 2014/0262573 A1* | 9/2014 | Ito | B60K 1/04 180/68.5 |
| 2014/0284125 A1* | 9/2014 | Katayama | B60K 1/04 180/68.5 |
| 2014/0291046 A1* | 10/2014 | Araki | B60K 1/04 180/68.5 |
| 2014/0302362 A1* | 10/2014 | Takizawa | H01M 10/625 429/83 |
| 2014/0338997 A1 | 11/2014 | Okada et al. | |
| 2014/0338998 A1* | 11/2014 | Fujii | B60K 1/04 180/68.5 |
| 2014/0338999 A1* | 11/2014 | Fujii | B60K 1/04 180/68.5 |
| 2015/0249240 A1* | 9/2015 | Hihara | B60K 1/04 180/68.5 |
| 2015/0255764 A1* | 9/2015 | Loo | H01M 2/1083 429/149 |
| 2017/0217498 A1* | 8/2017 | Akhlaque-e-rasul | B60K 1/04 |
| 2017/0225714 A1* | 8/2017 | Ito | B60G 3/06 |
| 2017/0225715 A1* | 8/2017 | Kobayashi | B60L 53/16 |
| 2018/0075996 A1* | 3/2018 | Narisawa | B60K 1/04 |
| 2018/0236863 A1* | 8/2018 | Kawabe | B62D 25/025 |
| 2018/0237075 A1* | 8/2018 | Kawabe | B60L 50/66 |
| 2018/0312199 A1* | 11/2018 | Kawase | B62D 25/025 |
| 2018/0312200 A1* | 11/2018 | Kawase | B62D 25/2036 |
| 2018/0370570 A1* | 12/2018 | Ayukawa | B62D 21/152 |
| 2019/0009661 A1* | 1/2019 | Okamura | B60K 1/04 |
| 2019/0176901 A1* | 6/2019 | Lee | B62D 25/2027 |
| 2019/0181398 A1* | 6/2019 | Shimada | H01M 2/1005 |
| 2019/0210483 A1* | 7/2019 | Sugitate | B60L 58/24 |
| 2019/0225272 A1* | 7/2019 | Yoshida | B62D 21/152 |
| 2019/0232773 A1* | 8/2019 | Kasai | B60K 1/04 |
| 2019/0233012 A1* | 8/2019 | Tai | B62D 21/152 |

* cited by examiner

LOWER VEHICLE BODY STRUCTURE

INCORPORATION BY REFERENCE

The disclosure of Japanese Patent Application No. 2018-039656 filed on Mar. 6, 2018 including the specification, drawings and abstract is incorporated herein by reference in its entirety.

BACKGROUND

1. Technical Field

The disclosure relates to a lower vehicle body structure.

2. Description of Related Art

In a lower vehicle body structure, a cross member extending in a vehicle right-left direction is provided in a floor in order to obtain strength and rigidity in the vehicle right-left direction. Further, a vehicle is known in which a battery pack is mounted underneath a floor. Japanese Unexamined Patent Application Publication No. 2014-226972 (JP 2014-226972 A) described below discloses a lower vehicle body structure in which a batter pack is mounted underneath a floor panel. On top of the floor panel, a cross member is provided, extending in a vehicle right-left direction so as to lie across the battery pack over the battery pack. A weak portion is provided in an upper surface of the cross member, and, at the time of a side impact, the cross member is bent downwardly starting from the weak portion.

SUMMARY

When the cross member is bent and projects toward the battery pack at the time of a side impact, a large load can be applied to the battery pack.

The disclosure provides a technique that reduces a load applied to a battery pack from a cross member at the time of a side impact.

An aspect of the disclosure provides a lower vehicle body structure, including: a floor of the vehicle; a battery pack mounted underneath the floor; and a cross member that extends in a vehicle right-left direction across the battery pack over the battery pack, and is provided on the floor, the cross member including inclined portions including a first inclined portion provided in a right half of the cross member in the vehicle right-left direction and a second inclined portion provided in a left half of the cross member in the vehicle right-left direction, the inclined portions becoming higher towards a center in the vehicle right-left direction.

Because the inclined portions are provided, the cross member is bent upwardly at the time of a side impact, and a damage of the battery pack is suppressed.

In the above aspect, the battery pack may be disposed so that a part of the battery pack enters a space between the first inclined portion and the second inclined portion. With the use of the space between the right and left inclined portions of the cross member, it is possible to increase a capacity of the battery pack.

In the above aspect, a bead may be provided in a surface of each of the inclined portions, the bead being bulged in a ridge shape or recessed in a groove shape and extending along the inclined portion. Because rigidity of the inclined portions is enhanced by the beads, deformation of the inclined portions themselves is restrained, thereby helping the cross member bend upwardly at the time of a side impact.

In the above aspect, a reinforcing member may be disposed in a lower surface of the cross member, the reinforcing member extending from one of the first inclined portion and the second inclined portion to the other of the first inclined portion and the second inclined portion. Strength of the cross member between the two inclined portions is enhanced by the reinforcing member. Thus, at the time of a side impact, a portion of the cross member on an outer side of the inclined portion in a vehicle right-left direction is deformed first, collision energy is absorbed, and application of a collision load to the battery pack is thus restrained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
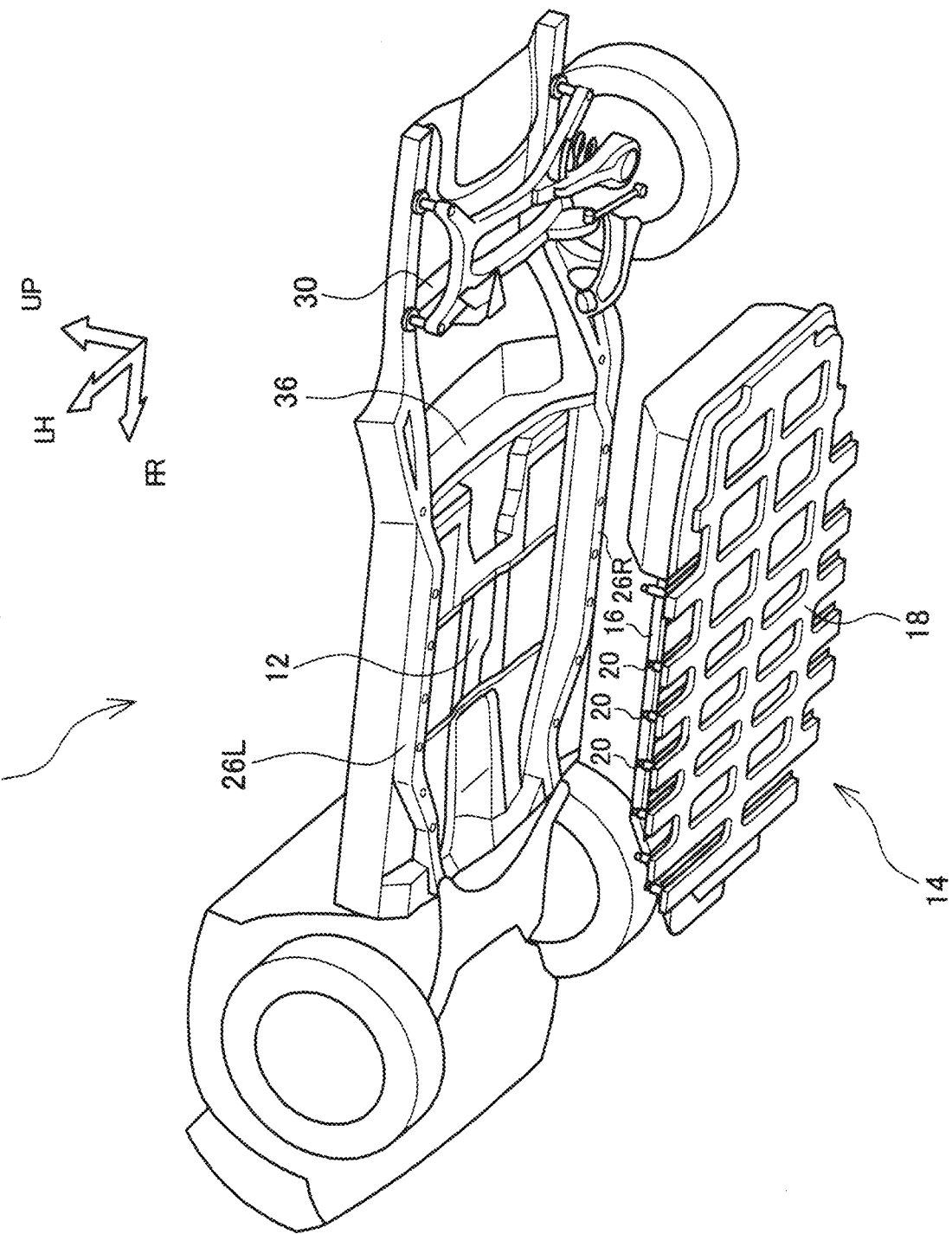
FIG. 1 is a perspective view of a lower vehicle body structure of a vehicle seen from below, and shows a state where a battery pack is separated from a floor.

Hereinafter, an embodiment of the disclosure is described with reference to the drawings. FIG. 1 is a schematic view of a lower vehicle body structure 10 of a vehicle. In the drawings, an arrow FR indicates a front direction of the vehicle, an arrow UP indicates an upper direction of the vehicle, and an arrow LH indicates a left direction of the vehicle. In the description below, terms that express directions such as front, rear, left, right, upper and lower directions, are directions related to a vehicle, unless otherwise specified.

A battery pack 14 that stores power to be supplied to a vehicle driving motor is mounted under a floor 12 of the lower vehicle body structure 10. In FIG. 1, the lower vehicle body structure 10 is shown in a state where the battery pack 14 is separated from the floor 12. The battery pack 14 includes a pack body 16 accommodating a battery, and a lattice-shaped support frame 18 disposed on a lower surface of the pack body 16. In a portion of the pack body 16 that comes underneath a rear seat of the vehicle, its dimension in an upper-lower direction is larger than a portion of the pack body 16 in front of the foregoing portion. The support frame 18 is supported on the floor 12 in a hanging manner by hanging members such as hanging bolts 20.

A pair of under reinforcements 26R, 26L extending in a front-rear direction is provided, the under reinforcements 26R, 26L being provided under right and left end edge portions of the floor 12, respectively. Further, an under cross member 30 is provided and extends in the right-left direction so as to connect the under reinforcements 26R, 26L with each other. The hanging bolts 20 are fastened to the under reinforcements 26R, 26L, and the battery pack 14 is supported by the under cross member 30 in a hanging manner as well. Thus, the battery pack 14 is mounted underneath the floor 12.

Figure 2:
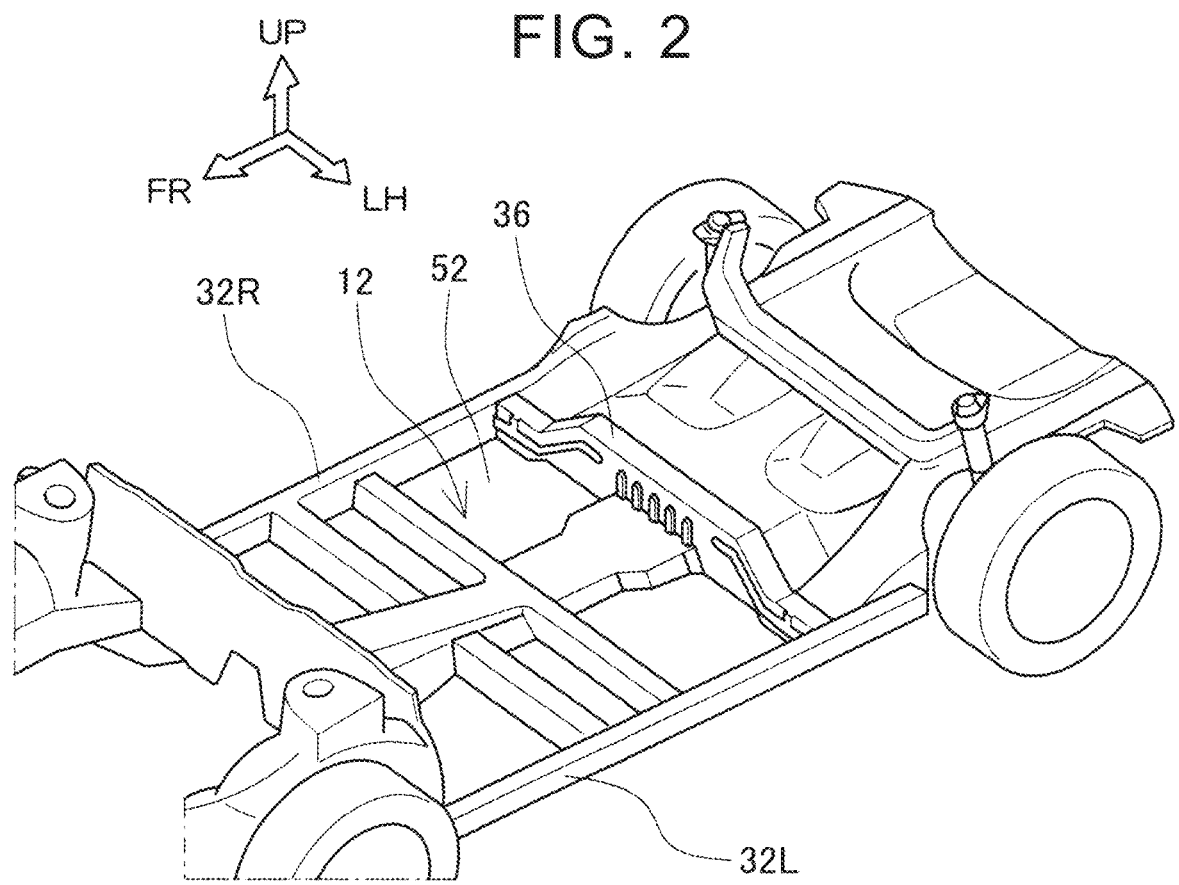
FIG. 2 is a perspective view of the lower vehicle body structure of a vehicle seen from above.
Figure 3:
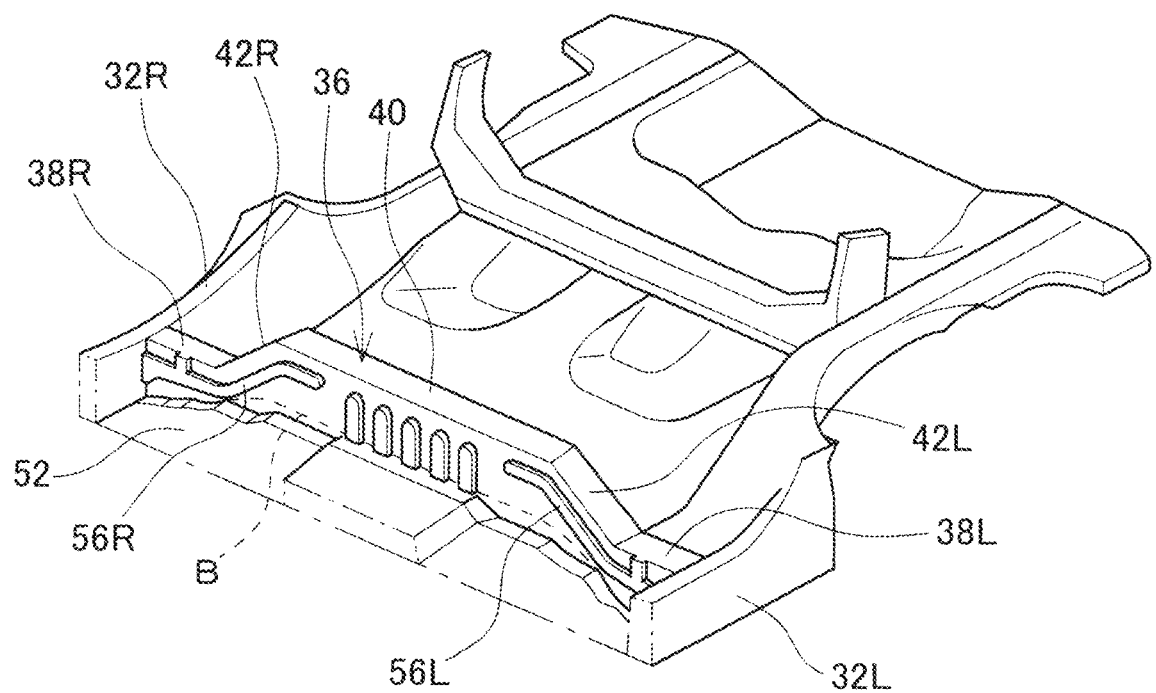
FIG. 3 is an enlarged perspective view of a main part of the lower vehicle body structure of a vehicle seen from above.

FIG. 2 and FIG. 3 are schematic configuration views of the lower vehicle body structure 10 seen from diagonally above. A pair of rockers 32R, 32L extending in the front-rear direction is provided on the floor 12. The rockers 32R, 32L are located on the right and left end edge portions of the floor 12, respectively. Further, a center floor cross member 36 extending in the right-left direction is provided so as to connect the right and left rockers 32R, 32L with each other. The center floor cross member 36 is a cross member positioned underneath the rear seat of the vehicle, and disposed so as to lie across the battery pack 14, especially the thick rear portion of the battery pack 14, over the battery pack 14. Hereinafter, the center floor cross member 36 is referred to as the cross member 36 for simplification purposes.

The cross member 36 includes right and left end portions 38R, 38L that are connected with the right and left rockers 32R, 32L, respectively, a center portion 40 extending horizontally in the center, and right and left inclined portions 42R, 42L that connect right and left end portions 38R, 38L with the center portion 40, respectively. The end portions 38R, 38L of the cross member 36 extend horizontally, and the center portion 40 is located higher than the end portions 38R, 38L. The inclined portions 42R, 42L are disposed so as to connect the end portions 38R, 38L with the center portion 40, respectively, and inclined so as to become higher toward the center. The end portions 38R, 38L may not be provided, and the inclined portions 42R, 42L may be directly connected with the rockers 32R, 32L, respectively. Also, the center portion 40 may not be provided, and the right and left inclined portions 42R, 42L may be connected with each other directly.

Figure 4:
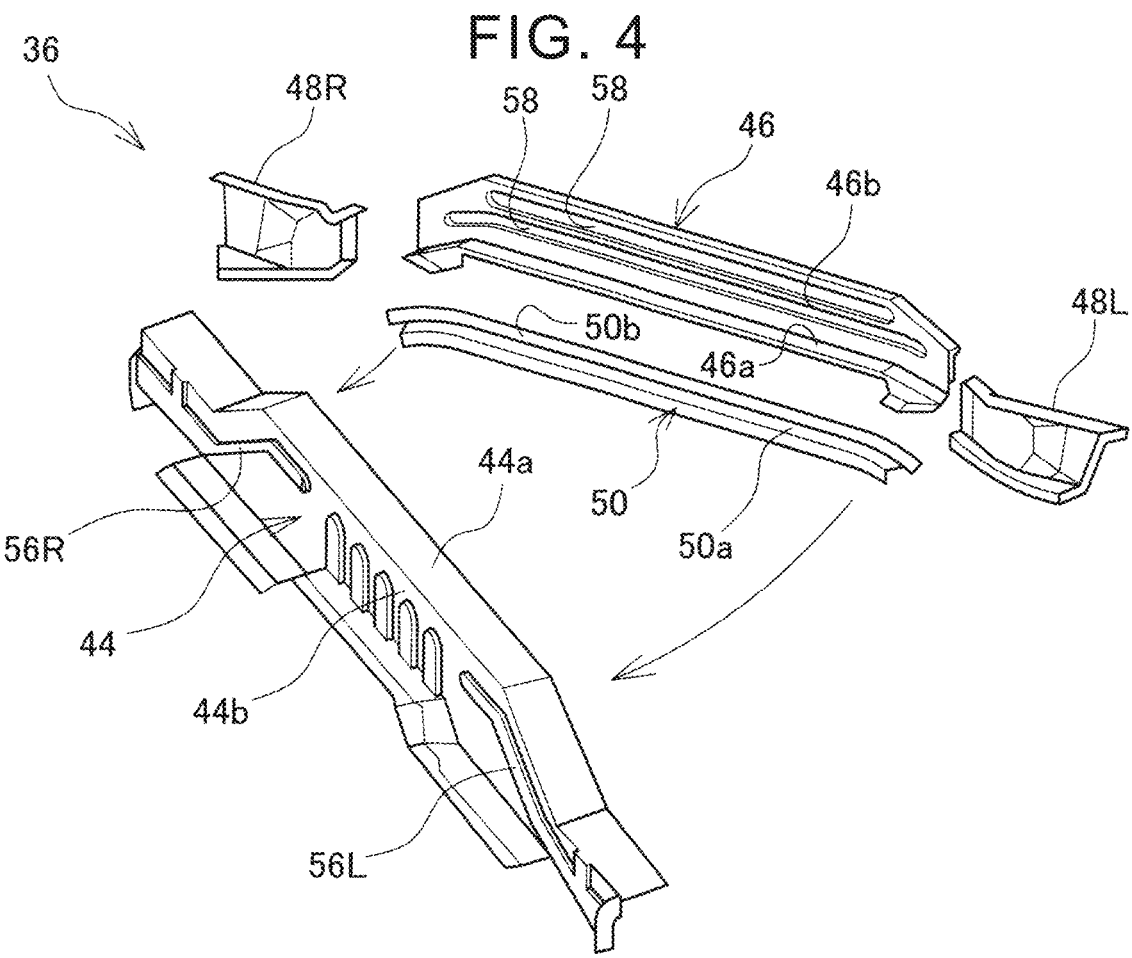
FIG. 4 is an exploded view of members included in a cross member.
Figure 5:
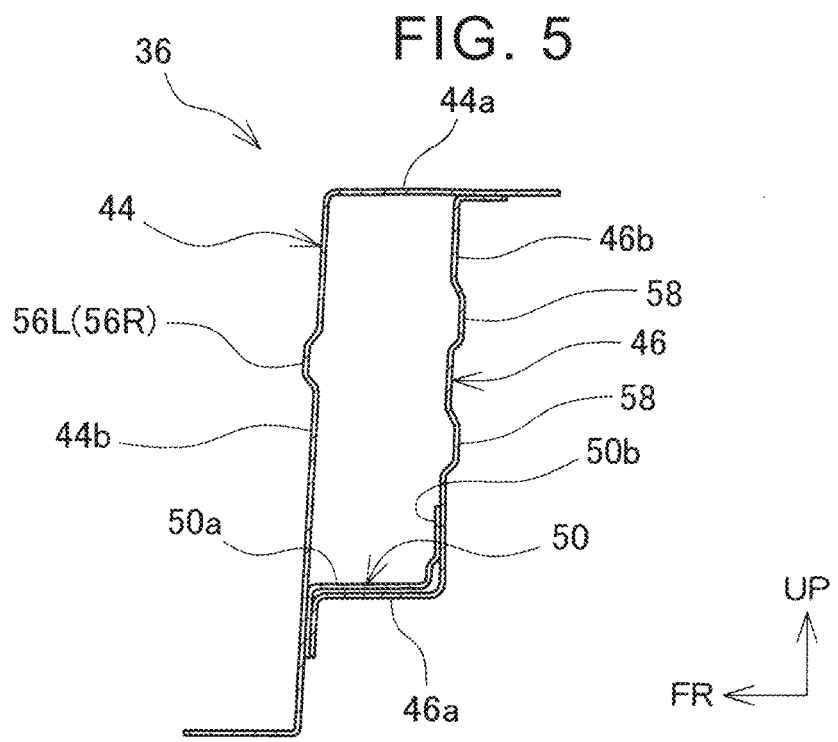
FIG. 5 is a transverse sectional view of a center portion of the cross member.
Figure 6:
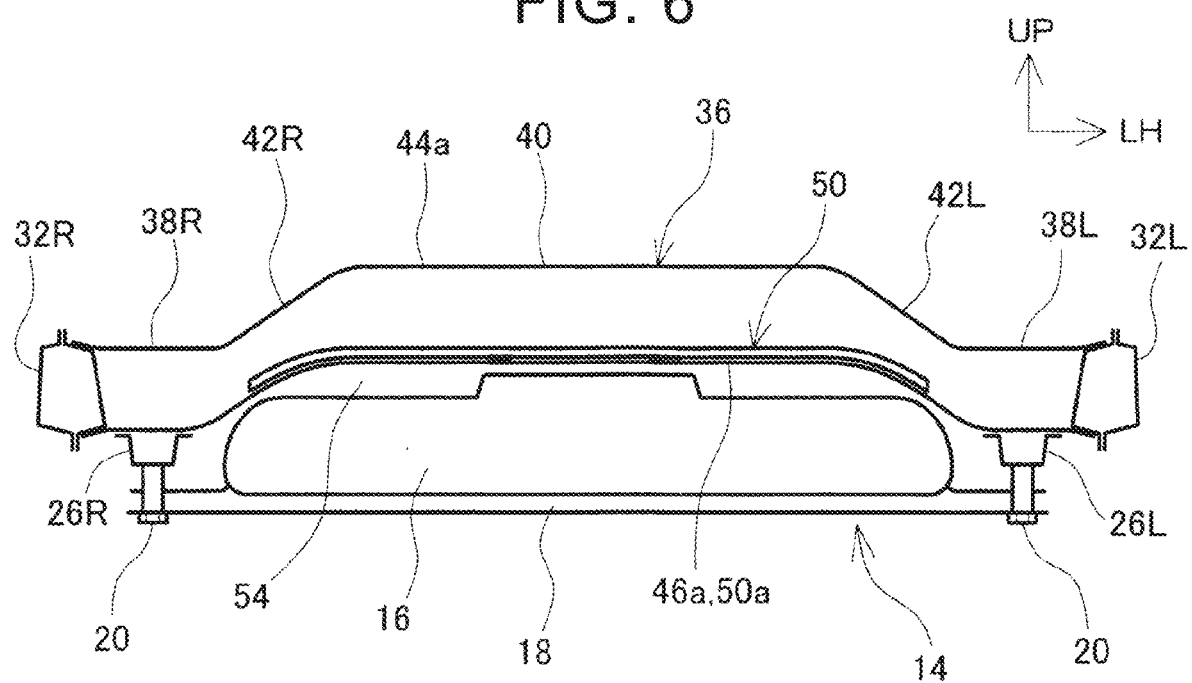
FIG. 6 is a sectional view of an area of the lower vehicle body structure where the cross member is provided.

FIG. 4 is an exploded view of members included in the cross member 36. FIG. 5 is a transverse sectional view of the center portion 40 of the cross member 36. FIG. 6 is a sectional view of an area of the lower vehicle body structure 10 where the cross member 36 is located, the section being orthogonal to the vehicle front-rear direction.

The cross member 36 includes a front panel 44 located on the front side, a rear center panel 46 and right and left rear side panels 48R, 48L located on the rear side, and a reinforcing panel 50 disposed inside the cross member 36. As the front panel 44 and the rear center panel 46 are joined to each other, the center portion 40 and the inclined portions 42R, 42L of the cross member 36 become a closed section structure. The end portions 38R, 38L of the cross member 36 have a closed section structure as the front panel 44, the rear side panels 48R, 48L, and a floor panel 52 are joined to each other. The floor panel 52 forms a bottom surface of the floor 12.

Both ends of the front panel 44 are joined to the right and left rockers 32R, 32L, respectively, by welding or the like. As understood well in FIG. 5, the front panel 44 has an upper surface wall 44a and a front surface wall 44b that are disposed at a right angle. The rear center panel 46 is provided so as to correspond to the center portion 40 and the inclined portions 42R, 42L of the cross member 36, and has a lower surface wall 46a and a rear surface wall 46b that are disposed at a right angle. The reinforcing panel 50 includes a lower surface reinforcing wall 50a along the lower surface wall 46a of the rear center panel, and a rear surface reinforcing wall 50b along the rear surface wall 46b of the rear center panel.

A flange portion provided in a front edge of the lower surface wall 46a of the rear center panel is joined to the front surface wall 44b of the front panel by welding or the like together with a flange portion provided in a front edge of the lower surface reinforcing wall 50a of the reinforcing panel. Also, a flange portion provided in an upper edge of the rear surface wall 46b is joined to the front panel 44 by welding or the like. Thus, the front panel 44 and the rear center panel 46 are joined together. Further, the rear surface reinforcing wall 50b of the reinforcing panel is joined to a lower edge portion of the rear surface wall 46b of the rear center panel by welding or the like.

By joining the front panel 44 and the rear center panel 46 to each other, a closed section structure having a rectangular section is formed. An upper surface and a front surface of the closed section structure are made of the upper surface wall 44a and the front surface wall 44b of the front panel, and a lower surface and a rear surface of the closed section structure are made of the lower surface wall 46a and the rear surface wall 46b of the rear center panel. A position of the lower surface of the closed section structure is shown by a broken line B in FIG. 3.

Upper edges of the rear side panels 48R, 48L are joined to the upper surface wall 44a of the front panel, and lower edges of the rear side panels 48R, 48L are joined to the floor panel 52 by welding or the like. In the closed section structures of the end portions 38R, 38L of the cross member 36, upper surfaces and front surfaces are made of the upper surface wall 44a and the front surface wall 44b of the front panel, respectively. Rear surfaces of the closed section structures are made of the rear side panels 48R, 48L, respectively. Also, lower surfaces of the closed section structures are made of the floor panel 52. The rear side panels 48R, 48L are joined to the rockers 32R, 32L, respectively, and to the rear surface wall 46b of the rear center panel by welding or the like.

In the end portions 38R, 38L of the cross member 36, the upper surface and the lower surface of the closed section structure of the cross member 36 extend horizontally in the right-left direction. In the center portion 40, the upper surface and the lower surface of the closed section structure extend horizontally in the right-left direction at a position higher than the end portions 38R, 38L. In the inclined portions 42R, 42L, the upper surface and the lower surface of the closed section structure are inclined so as to become higher towards the center.

In the front surface wall 44b of the front panel, ridge-shaped front surface beads 56R, 56L are provided. The front surface beads 56R, 56L bulge towards an outer side of the closed section structure and extend along a direction in which the cross member 36 extends. The front surface bead 56L on the left side extends from a left end of the cross member 36 to a left end portion of the center portion 40 through the end portion 38L and the inclined portion 42L. The front surface bead 56R on the right side also extends from a right end of the cross member 36 to a right end portion of the center portion 40 through the end portion 38R and the inclined portion 42R. The front surface beads 56R, 56L are provided at least in the inclined portions 42R, 42L, respectively, enhancing strength of the inclined portions 42R, 42L. The front surface beads 56R, 56L may be groove-shaped beads that are recessed to an inside of the closed section structure. The beads that reinforce the inclined portions 42R, 42L may be provided not only in the front surface of the cross member 36 but also in another surface or a plurality of surfaces.

In the rear surface wall 46b of the rear center panel, ridge-shaped rear surface beads 58 are provided. The rear surface beads 58 extend in the direction in which the cross member 36 extends. In the cross member 36, the number of the rear surface beads 58 provided is two, but it can be one, three, or more. Further, the rear surface beads 58 may be groove-shaped beads that are recessed to an inside of the closed section structure.

Since the inclined portions 42R, 42L are provided in the right and left parts of the cross member 36, respectively, the cross member 36 has a bent shape that projects upwardly as a whole. With the bent shape, a lower space 54 is formed underneath the cross member 36, especially between the inclined portions 42R, 42L. The battery pack 14 is mounted so that an upper portion of the battery pack 14 enters the lower space 54.

The reinforcing panel 50 extends from the inclined portion 42R of the cross member 36 on the right side to the inclined portion 42L on the left side through the center portion 40. Thus, a lower surface of the closed section structure is reinforced. The reinforcing panel 50 is disposed in accordance with disposition of the battery pack 14 in the right-left direction. Dimensions of the reinforcing panel 50 and the battery pack 14 in the right-left direction are almost equal. Because the reinforcing panel 50 does not reach the right and left end portions 38R, 38L of the cross member 36, strength of the end portions 38R, 38L is lower than that of the center portion 40. Due to this difference in strength, when a collision load is small at the time of a side impact, the end portion 38L (or 38R) is crushed and absorbs impact energy, and deformation of the reinforced portion is restrained. Thus, a collision load applied to the battery pack 14 is reduced.

Figure 7:
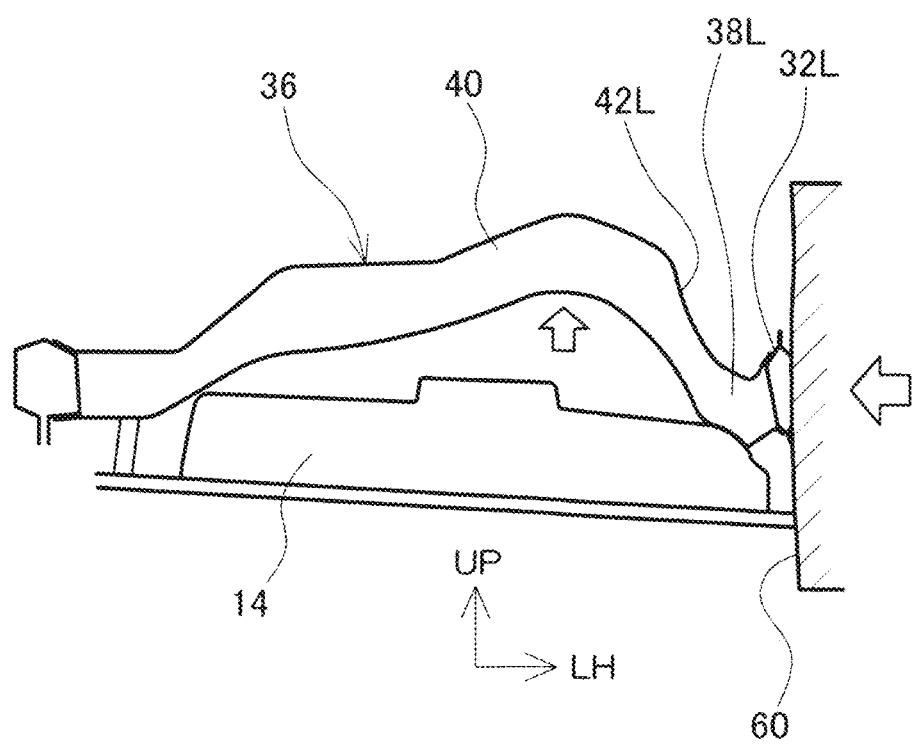
FIG. 7 is a view showing a deformed state of the cross member and its periphery at the time of a side impact.

FIG. 7 is a view of an example of how the cross member 36 is deformed at the time of a side impact. When a collision object 60 collides with a vehicle from the left side, the rocker 32L is crushed first. When a collision load is great, the inclined portion 42L then pushes up a left end of the center portion 40. Thus, a boundary between the inclined portion 42L and the center portion 40 is bent upwardly. As a result, even when a part of the battery pack 14 is disposed in the lower space 54 of the cross member 36, the cross member 36 bends in an opposite side from the battery pack 14 (upwardly), and a collision load applied to the battery pack 14 from the cross member 36 is suppressed. Further, because the front surface bead 56L is provided in the inclined portion 42L, rigidity and strength of the inclined portion 42L are enhanced, deformation of the inclined portion 42L itself is restrained, and a collision load is transferred to the center portion 40 highly efficiently. Thus, the left end of the center portion 40 is moved greatly upwardly so that the cross member 36 is separated from the battery pack 14 further.

What is claimed is:

1. A lower vehicle body structure, comprising:
a floor of the vehicle;
a battery pack mounted underneath the floor; and
a cross member that extends in a vehicle right-left direction across the battery pack over the battery pack, and is provided on the floor, the cross member including inclined portions including a first inclined portion provided in a right half of the cross member in the vehicle right-left direction and a second inclined portion provided in a left half of the cross member in the vehicle right-left direction, the inclined portions becoming higher towards a center in the vehicle right-left direction,
wherein a surface of each of the inclined portions has a bead, and the bead is bulged in a ridge shape or recessed in a groove shape and extends along each inclined portion.

2. The lower vehicle body structure according to claim 1, wherein
the battery pack is disposed so that a part of the battery pack enters a space between the first inclined portion and the second inclined portion.

3. The lower vehicle body structure according to claim 1, wherein
a reinforcing member is disposed in a lower surface of the cross member, the reinforcing member extending from one of the first inclined portion and the second inclined portion to the other of the first inclined portion and the second inclined portion.

4. The lower vehicle body structure according to claim 1, wherein
the cross member comprises a first end portion, a second end portion opposite to the first end portion, and a center portion between the first end portion and the second end portion, and
the first inclined portion is between the first end portion and the center portion, and the second inclined portion is between the second end portion and the center portion.

5. The lower vehicle body structure according to claim 4, wherein the center portion is connected to an end of the first inclined portion furthest from the first end portion and the center portion is connected to an end of the second inclined portion furthest from the second end portion.

6. The lower vehicle body structure according to claim 4, wherein
the floor comprises a first rocker on a right side of the vehicle extending in a vehicle front-rear direction, and a second rocker on a left side of the vehicle extending the vehicle front-rear direction, and
the first end portion is connected with the first rocker and the second end portion is connected with the second rocker.

7. The lower vehicle body structure according to claim 6, wherein the first end portion is directly connected with the first rocker and the second end portion is directly connected with the second rocker.

8. The lower vehicle body structure according to claim 1, wherein
the floor comprises a first rocker on a right side of the vehicle extending in a vehicle front-rear direction, and a second rocker on a left side of the vehicle extending the vehicle front-rear direction, and
the first inclined portion is connected with the first rocker and the second inclined portion is connected with the second rocker.

9. The lower vehicle body structure according to claim 8, wherein the first inclined portion is directly connected with the first rocker and the second inclined portion is directly connected with the second rocker.

10. The lower vehicle body structure according to claim 1, wherein the first inclined portion is directly connected with the second inclined portion.

11. A lower vehicle body structure, comprising:
a floor of the vehicle;
a battery pack mounted underneath the floor;

a cross member that extends in a vehicle right-left direction across the battery pack over the battery pack, and is provided on the floor, the cross member including inclined portions including a first inclined portion provided in a right half of the cross member in the vehicle right-left direction and a second inclined portion provided in a left half of the cross member in the vehicle right-left direction, the inclined portions becoming higher towards a center in the vehicle right-left direction; and a reinforcing member in a lower surface of the cross member, the reinforcing member extending from one of the first inclined portion and the second inclined portion to the other of the first inclined portion or the second inclined portion.

12. The lower vehicle body structure according to claim 11, wherein the battery pack is in a space between the first inclined portion and the second inclined portion.

13. The lower vehicle body structure according to claim 11, wherein
the cross member comprises a first end portion, a second end portion opposite to the first end portion, and a center portion between the first end portion and the second end portion, and
the first inclined portion is between the first end portion and the center portion, and the second inclined portion is between the second end portion and the center portion.

14. The lower vehicle body structure according to claim 13, wherein the center portion is connected to an end of the first inclined portion furthest from the first end portion and the center portion is connected to an end of the second inclined portion furthest from the second end portion.

15. The lower vehicle body structure according to claim 13, wherein
the floor comprises a first rocker on a right side of the vehicle extending in a vehicle front-rear direction, and a second rocker on a left side of the vehicle extending the vehicle front-rear direction, and
the first end portion is connected with the first rocker and the second end portion is connected with the second rocker.

16. The lower vehicle body structure according to claim 15, wherein the first end portion is directly connected with the first rocker and the second end portion is directly connected with the second rocker.

17. The lower vehicle body structure according to claim 11, wherein
the floor comprises a first rocker on a right side of the vehicle extending in a vehicle front-rear direction, and a second rocker on a left side of the vehicle extending the vehicle front-rear direction, and
the first inclined portion is connected with the first rocker and the second inclined portion is connected with the second rocker.

18. The lower vehicle body structure according to claim 17, wherein the first inclined portion is directly connected with the first rocker, and the second inclined portion is directly connected with the second rocker.

19. The lower vehicle body structure according to claim 11, wherein the first inclined portion is directly connected with the second inclined portion.

* * * * *